US010227800B2

(12) United States Patent
Trussler (10) Patent No.: US 10,227,800 B2
(45) Date of Patent: Mar. 12, 2019

(54) ENCLOSURE LOCKING ASSEMBLY (71) Applicant: Chromalox, Inc., Pittsburgh, PA (US)

(72) Inventor: Richard Mark Trussler, LaVergne, TN (US)

(73) Assignee: Chromalox, Inc., Pittsburgh, PA (US)

( * ) Notice: Subject to any disclaimer, the term of this patent is extended or adjusted under 35 U.S.C. 154(b) by 0 days.

(21) Appl. No.: 15/478,937

(22) Filed: Apr. 4, 2017

(65) Prior Publication Data

US 2018/0283060 A1    Oct. 4, 2018

(51) Int. Cl.
| E05C 9/06 | (2006.01) |
| E05C 9/18 | (2006.01) |
| E05C 9/22 | (2006.01) |
| H02B 1/38 | (2006.01) |
| H02B 1/28 | (2006.01) |

(52) U.S. Cl.
CPC ............ *E05C 9/063* (2013.01); *E05C 9/1808* (2013.01); *E05C 9/22* (2013.01); *H02B 1/28* (2013.01); *H02B 1/38* (2013.01); *E05C 9/1858* (2013.01)

(58) Field of Classification Search
CPC .......... E05C 9/06; E05C 9/063; E05C 9/1808; E05C 9/1825; E05C 9/1858; E05C 9/22; H02B 1/38; H02G 3/081
USPC .... 312/326, 215, 216, 217, 296; 292/34, 36, 292/156, 157; 49/70, 394, 395
See application file for complete search history.

(56) References Cited

U.S. PATENT DOCUMENTS

| 4,864,466 | A | * | 9/1989 | Gasparetto | H02B 1/14 361/605 |
| 5,120,094 | A | * | 6/1992 | Eaton | E05B 65/087 292/159 |
| 5,887,916 | A | | 3/1999 | Finkelstein et al. | |
| 5,905,244 | A | * | 5/1999 | Smith | H02B 11/12 200/50.17 |
| 6,561,604 | B2 | | 5/2003 | Leccia et al. | |
| 6,746,092 | B2 | | 6/2004 | Leccia et al. | |
| 7,871,137 | B2 | * | 1/2011 | Schulz | H02B 1/28 312/296 |
| 8,733,853 | B2 | | 5/2014 | Gingrich | |
| 2013/0298468 | A1 | | 11/2013 | Gasparetto | |
| 2016/0177603 | A1 | * | 6/2016 | Sims | E05C 9/063 292/101 |
| 2017/0027072 | A1 | * | 1/2017 | Bhalla | H02B 1/306 |

* cited by examiner

*Primary Examiner* — James O Hansen
(74) *Attorney, Agent, or Firm* — K&L Gates LLP (57) ABSTRACT

Enclosure comprises a plurality of bar members translatably attached to an interior surface of the door of the enclosure. Each of the plurality of bar members comprises a projection. A plurality of blocks are disposed on a peripheral edge of the opening of the enclosure's body, such that there is a corresponding block for each projection, and wherein each of the plurality of blocks define a channel for receiving and engaging its corresponding projection. When actuated in a first member, an actuator causes each of the plurality of bar members to translate between a first position and a second position. When the door is in a closed position, translation of the bar members to the first position causes each projection to engage with the channel of its corresponding block to thereby hold the door in the closed position. Translation of the plurality of bar members to the second position causes each projection to be translated out of engagement with its corresponding block such that the door can be opened.

27 Claims, 13 Drawing Sheets

ENCLOSURE LOCKING ASSEMBLY

BACKGROUND

Metal enclosures for switchgear or other equipment utilized for the distribution of electricity must be able to withstand tremendous forces generated by internal arcs. If the locking mechanisms for such enclosures are not sufficiently durable, then the force of an internal arc can cause injury to nearby individuals and damage to adjacent equipment. Such enclosures are generally equipped with a vent for releasing gasses generated as a result of an internal arc. The vents are generally fastened closed or otherwise sealed, but are designed to open to release internal arc gasses upon experiencing a sufficient force. Therefore, the locking mechanisms for metal switchgear enclosures need to be strong enough to withstand the internal forces until the internal arc is over.

Locking mechanisms for such enclosures generally have a number of drawbacks, including that they have a number of different locking components that are difficult to align, are extremely time consuming to lock and unlock, have a number of sharp or otherwise dangerous projections extending around the door that can injure workers when the door is open, and are prone to mechanical failures due to rusting. Other locking mechanisms not specifically adapted for such applications are not suitable for the size and weight of the doors used for metal switchgear enclosures.

SUMMARY

In one general aspect, the present invention is directed to an enclosure, particularly one housing switchgear or other electricity distribution equipment that is susceptible to arcing. In various embodiments, the enclosure comprises a plurality of bar members translatably attached to an interior surface of the door of the enclosure. Each of the plurality of bar members comprises a projection. In addition, a plurality of blocks are disposed on a peripheral edge of the opening of the enclosure's body, such that there is a corresponding block for each projection, and wherein each of the plurality of blocks define a channel for receiving and engaging its corresponding projection. The enclosure also includes an actuator connected to the plurality of bar members. When actuated in a first member, the actuator causes each of the plurality of bar members to translate between a first position and a second position. For example, when the door is in a closed position, translation of the bar members to the first position causes each projection to engage with the channel of its corresponding block to thereby hold the door in the closed position. Conversely, translation of the plurality of bar members to the second position causes each projection to be translated out of engagement with its corresponding block such that the door can be opened.

When in the locked (or "first") position, the engagement of the projections on the bar members with the channels of the blocks around the opening of the enclosure is sufficiently strong to hold the door closed in the event of an arc occurrence inside the enclosure. Gases, if any, from the arc can then exit safely through a vent in the top of the enclosure. Moreover, the locking mechanism is easy to use and suitable for large enclosures. Further, it does not include any sharp, dangerous projections. These and other benefits of the present invention will be apparent from the description that follows.

BRIEF DESCRIPTION OF THE DRAWINGS

Various embodiments of the present invention are described herein by way of example in conjunction with the following figures, wherein.

DETAILED DESCRIPTION OF THE INVENTION

Figure 1:
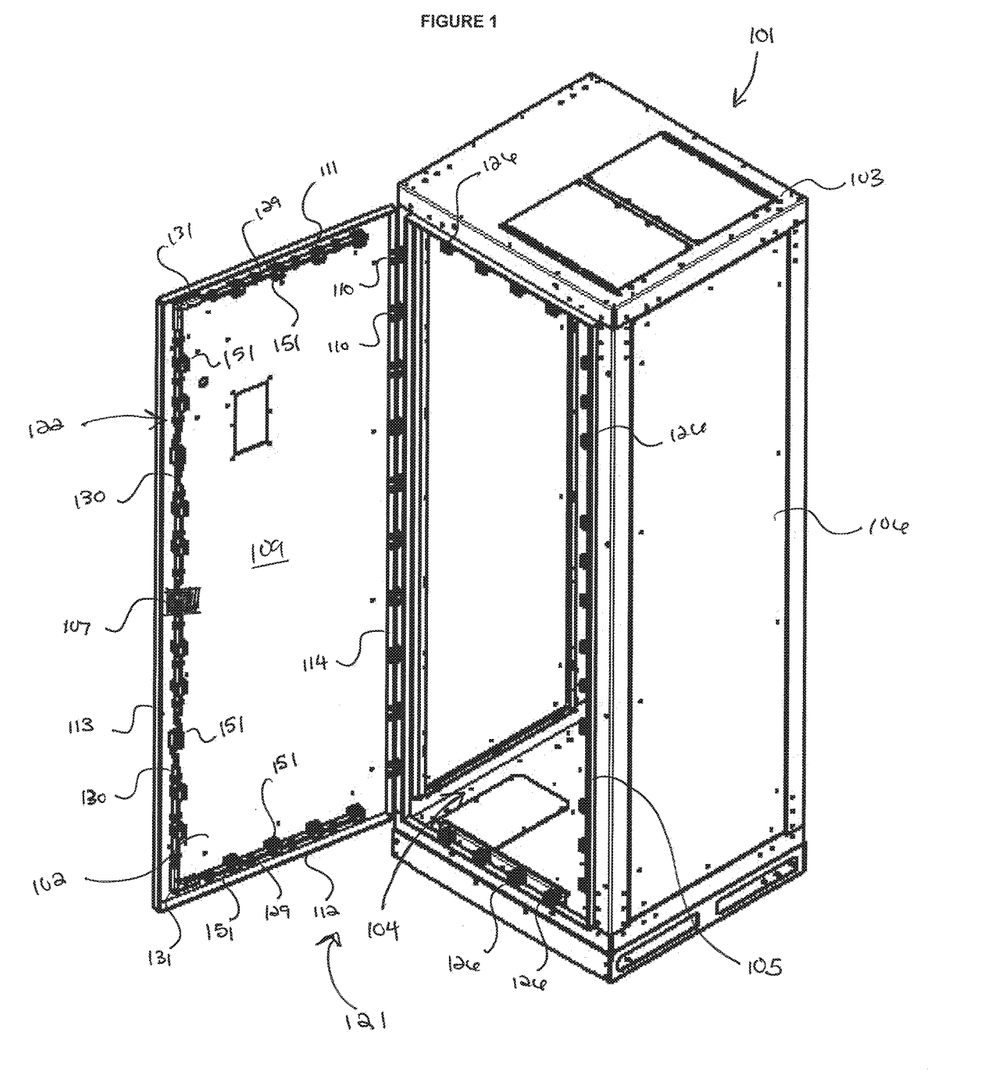
FIG. 1 depicts an enclosure according to various embodiments of the present disclosure.

The present disclosure is directed generally to housings or enclosures including locking systems. Referring now to FIG. 1, there is shown an enclosure according to an embodiment of the present disclosure. The depicted embodiment of the enclosure 101 comprises a door 102 that is pivotably attached to a body 103 via one or more hinges 110 or pivot joints. The body 103 comprises a plurality of walls 106 defining a partially enclosed interior volume. In the depicted embodiment of the enclosure 101, the walls 106 include a base, a plurality of sidewalls extending from the base, and a top, which are arranged in a cuboidal shape. However, the depicted embodiment is merely illustrative and not intended to limit the walls 106 of the body 103 to any particular shape, number, or configuration. The body 103 further includes an opening 104 defined by a peripheral edge 105 extending thereabout. By virtue of being pivotably attached to the body 103, the door 102 is transitionable between an open position and a closed position. In the closed position, the interior volume of the body 103 is enclosed by the door 102, i.e., the door 102 is coextensive with or extends beyond the peripheral edge 105 of the body 103.

The enclosure 101 further comprises a locking assembly 121 configured to maintain the door 102 in the closed position when the locking assembly 121 is engaged. The locking assembly 121 includes a plurality of slidable or transitionable bar members 122 disposed on the interior surface 109 of the door 102. The bar members 122 include a plurality of projections 123 extending therefrom that are configured to cooperate with a plurality of blocks 126 disposed along the peripheral edge 105 of the body 103. When the door 102 is closed, the locking assembly 121 is transitionable between a locked position, wherein the projections 123 are engaged with the blocks 126, and an unlocked position, wherein the projections 123 are disengaged from the blocks 126. When the projections 123 are engaged with the blocks 126, i.e., the locking assembly 121 is locked, the door 102 is prevented from being opened due to the blocks 126 securing the projections 123 in place, which in turn secures the assembly of the bar members 122 and the door 102 place. Conversely, when the projections 123 are not engaged with the blocks 126, the door 102 can be opened without restriction from the locking assembly 121.

The locking assembly 121 is transitioned between the locked and unlocked positions by an actuator 107. In an illustrative embodiment, the actuator 107 comprises a handle disposed on the exterior surface 108 of the door, which is operably connected via a mechanical linkage 141, an example of which can be seen in FIG. 11, to one or more of the bar members 122 in order to translate the bar members 122. In alternative embodiments, the actuator 107 comprises a detachable lever. In other alternative embodiments, the actuator 107 comprises a solenoid or a motor, e.g., a servomotor, that is configured to translate the bar members 122 according to an appropriate input. In such embodiments, the enclosure 101 can further include an input device that is connected via a mechanical linkage to the motor or that is in electrical or signal communication with the motor for controlling the operation thereof. The input devices can included, e.g., a keyway that is configured to receive a key and a touchscreen display configured to receive input commands from a user and thereby control the activation and other parameters associated with the operation of the motor. In still other embodiments, the actuator can include a wireless transceiver for receiving wireless commands or signals to engage or disengage the locking assembly 121 without direct, physical action by a user. In various embodiments, a manner of actuating the actuator 107 can include turning or otherwise physically manipulating the actuator 107, transmitting a control signal to the actuator 107, and inputting commands into the actuator via, e.g., a touchscreen.

Figure 2A:
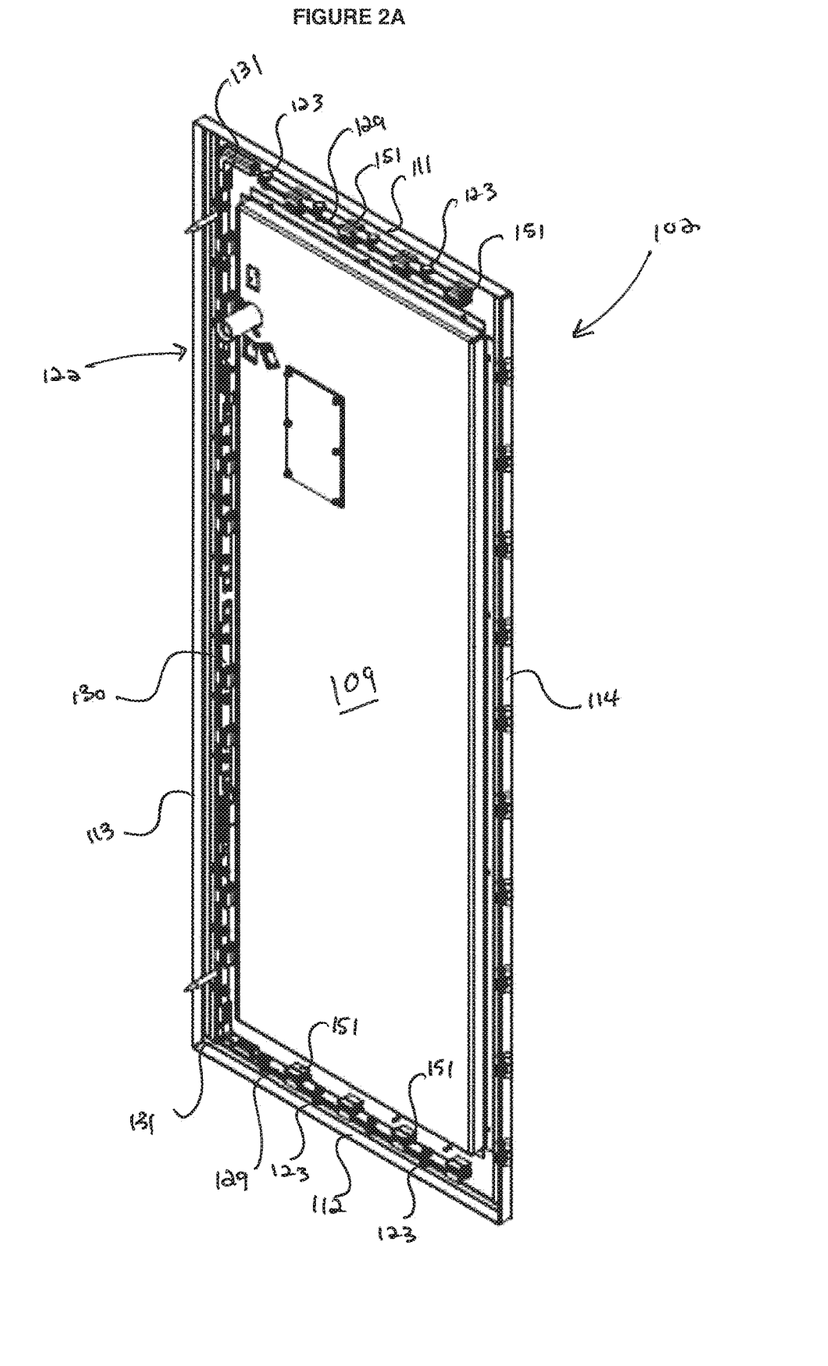
FIG. 2A depicts a perspective view of the interior surface of the door according to various embodiments of the present disclosure.
Figure 2B:
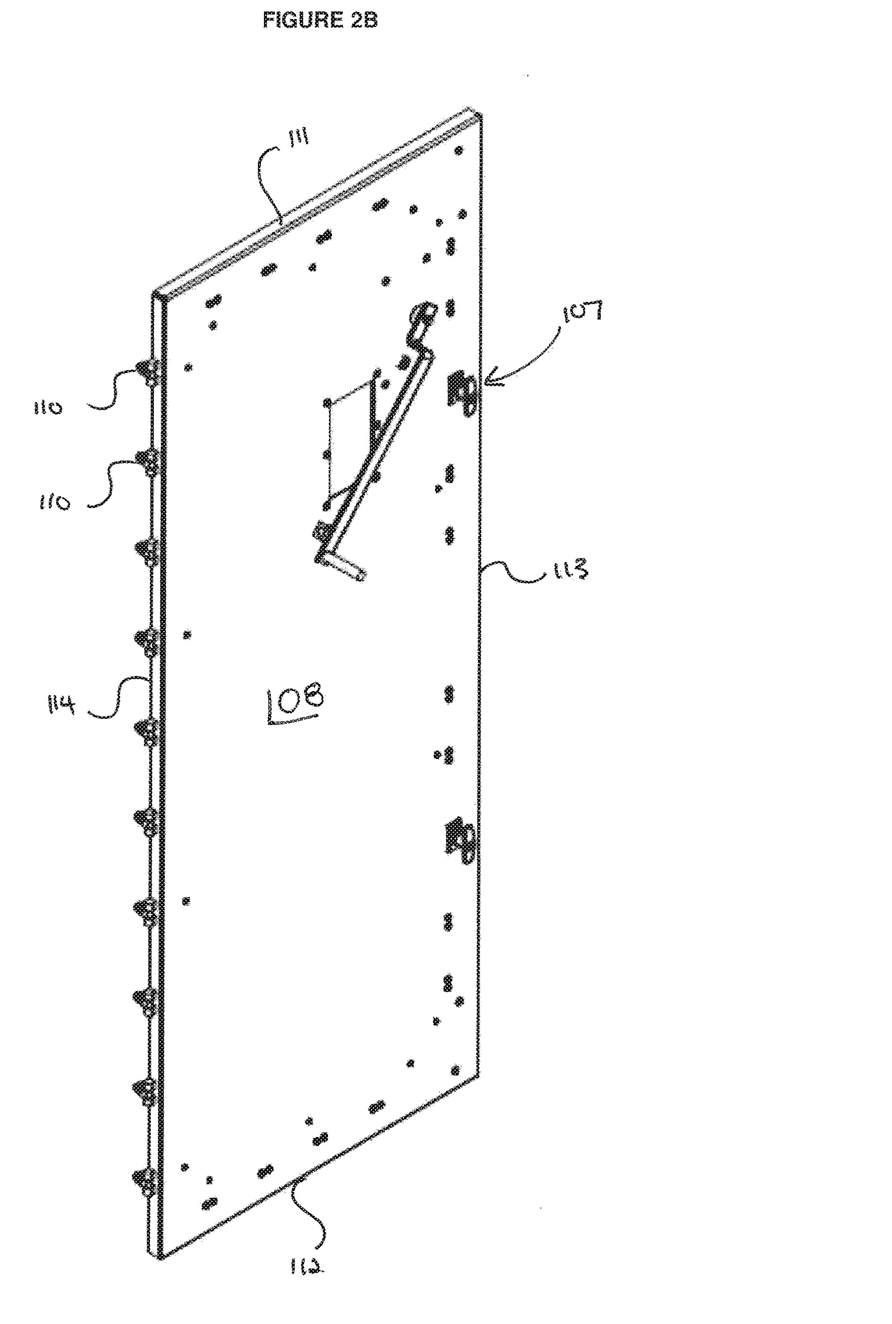
FIG. 2B depicts a perspective view of the exterior surface of the door according to various embodiments of the present disclosure.
Figure 3:
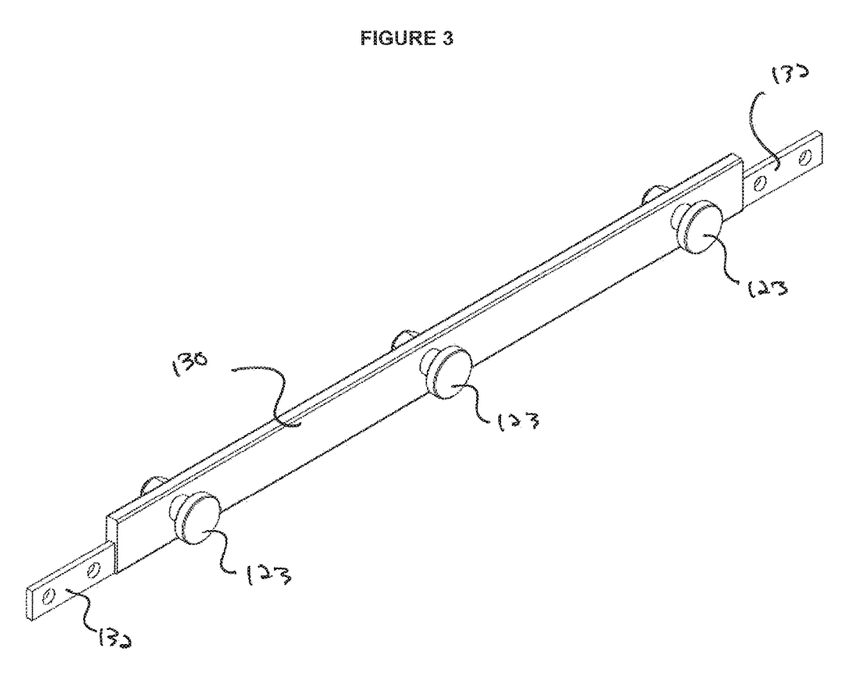
FIG. 3 depicts a perspective view of a bar member according to various embodiments of the present disclosure.
Figure 4:
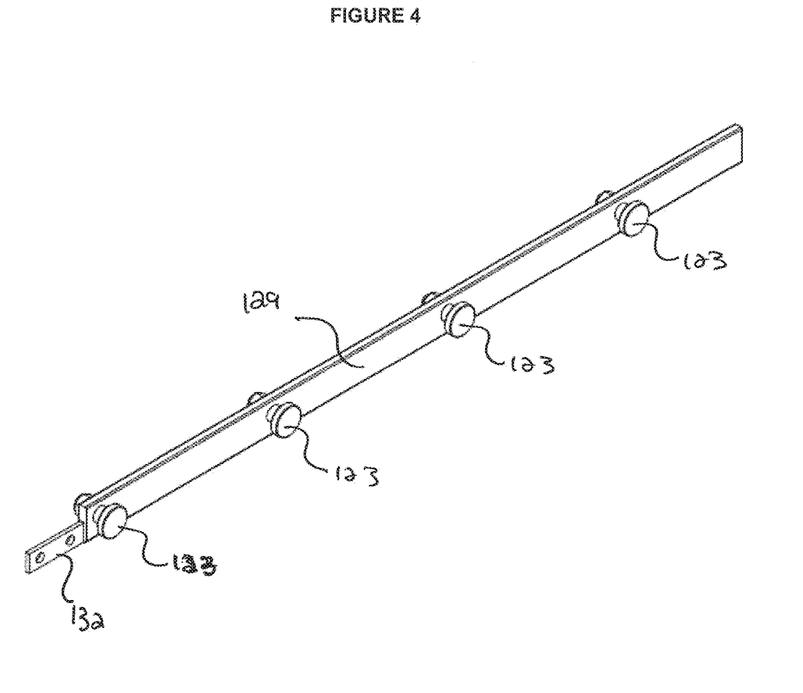
FIG. 4 depicts a perspective view of a bar member according to various embodiments of the present disclosure.

Referring now to FIGS. 2-4, there are shown a perspective view of the interior and exterior surfaces of the door and perspective views of the bar members in isolation. The bar members 122 are translatably positioned along the peripheral edge of the interior surface 109 of the door 102 such that they are aligned or substantially aligned with the corresponding blocks 126 positioned along the peripheral edge 105 about the opening 104. In an illustrative embodiment of the enclosure 101, the bar members 122 extend around each of the edges of the interior surface 109 of the door 102, except the edge to which the door 102 is pivotably attached to the body 103. In the depicted rectangularly shaped embodiment of the door 102, the bar members 122 extend along three of the edges of the door 102: the top horizontal edge 111, the bottom horizontal edge 112, and the distal vertical edge 113 opposite the proximal vertical edge 114 at which the door is pivotably attached to the body 103. The bar members 122 can include two or more horizontal bar members 129, which are positioned along the top horizontal edge 111 and the bottom horizontal edge 112, and one or more vertical bar members 130, which are positioned along the distal vertical edge 130. In other embodiments, the bar members 122 can be on a different number of sides of the interior surface 109 of the door 102. In the depicted embodiment, the bar members 122 extend the entire length of their respective edges of the door 102. In other embodiments, the bar members 122 could extend only a portion of the length of their corresponding edges.

Figure 12:
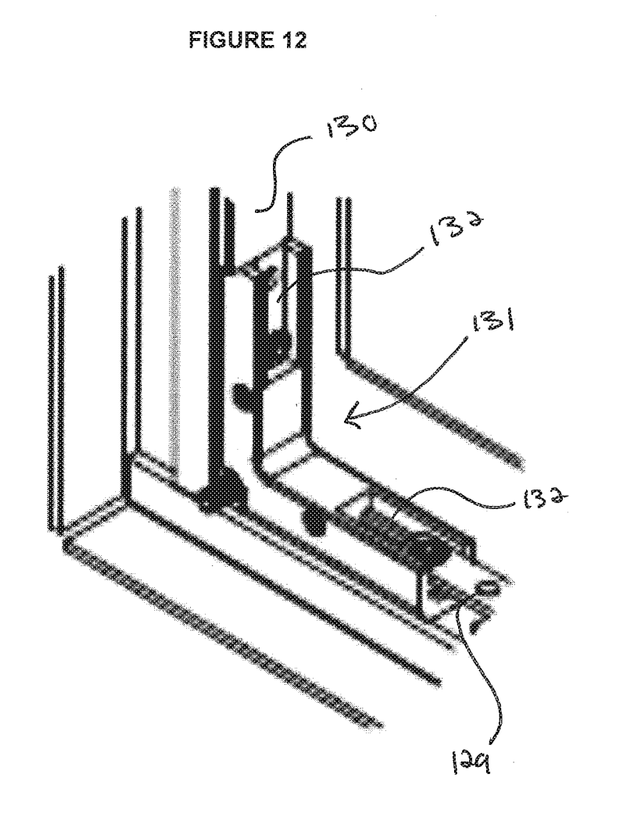
FIG. 12 depicts a perspective view of a transitional linkage according to various embodiments of the present disclosure.

In various embodiments, the horizontal bar members 129 are directly or indirectly attached to an end of a vertical bar member 130 via a transitional linkage 131, an example of which can be seen in FIG. 12. The transitional linkage 131 is configured to translate vertical movement to horizontal movement and vice versa. The transitional linkage 131 can include, e.g., a bellcrank or another such mechanical linkage where the ends of the horizontal and vertical bar members 129, 130 are physically coupled. The transitional linkage 131 can also include mechanisms where the bar members 122 are not physically coupled together, e.g., motorized assemblies configured to receive the motion generated by one of the bar members 122 and impart a corresponding motion on the corresponding bar member 122, and any other such mechanism for translating the motion of one bar member 122 to a corresponding bar member 122. The transitional linkage 131 is attached to each horizontal bar member 129 and the vertical bar member 130 at an attachment point 132 disposed at one or more of the distal ends thereof. As seen in FIG. 3, a vertical bar member 130 can comprise two attachment points 132 disposed at each of its distal ends as it is an intermediate member joined between, e.g., the actuator and a horizontal bar member 129 or between two horizontal bar members 129. As seen in FIG. 4, the horizontal bar members 129 can comprise a single attachment point 132 disposed at one of its distal ends. In the depicted embodiment, the transitional linkage 131 is secured to the attachment points 132 of the bar members 122 via fasteners that are secured through apertures at the attachment points 132. However, the transitional linkage 131 can additionally be secured to the bar members 122 via welding, soldering, or any other such mechanism.

In one embodiment, the door 102 further comprises guide blocks 151 disposed along the interior surface 109 of the door 102 in alignment with the bar members 122. The guide blocks 151 each comprise a channel 152 that is sized and shaped to slidably receive the bar members 122 therethrough, providing support to the bar members 122 while still permitting the bar members 122 to translate between the locked and unlocked positions. In one embodiment, the dimensions of the channels 152 are fabricated to a close tolerance of the dimensions of the bar members 122 in order to limit lateral movement of the bar members 122.

The projections 123 preferably extend orthogonally from the bar members 122, generally towards the opening 104 of the enclosure 101. In one embodiment, the number of projections 123 is equal to the number of blocks 126 disposed on the body 103. Furthermore, the projections 123 are positioned such that in a first position they do not engage or otherwise interfere with the blocks 126 and that in a second position each projection 123 engages with a single corresponding block 126 when the door 102 is closed and the actuator 107 is latched into the closed position. Therefore in this embodiment, each of the blocks 126 is occupied by a corresponding projection 123 when the locking assembly 121 is engaged, i.e., when the door is closed and locked. Engagement of the locking assembly 121 to hold the door 102 closed significantly inhibits the likelihood that the door 102 could blast open in the event of an arc within the interior of the enclosure 101 and ensures that any gasses generated from the arc are directed through the vent of the enclosure 101.

Figure 5:
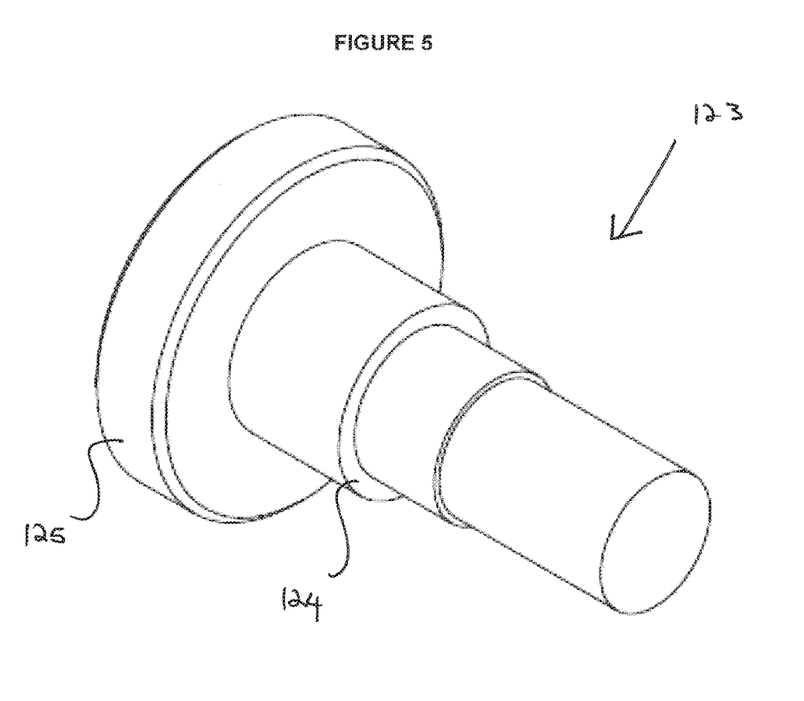
FIG. 5 depicts a perspective view of a projection according to various embodiments of the present disclosure.
Figure 6:
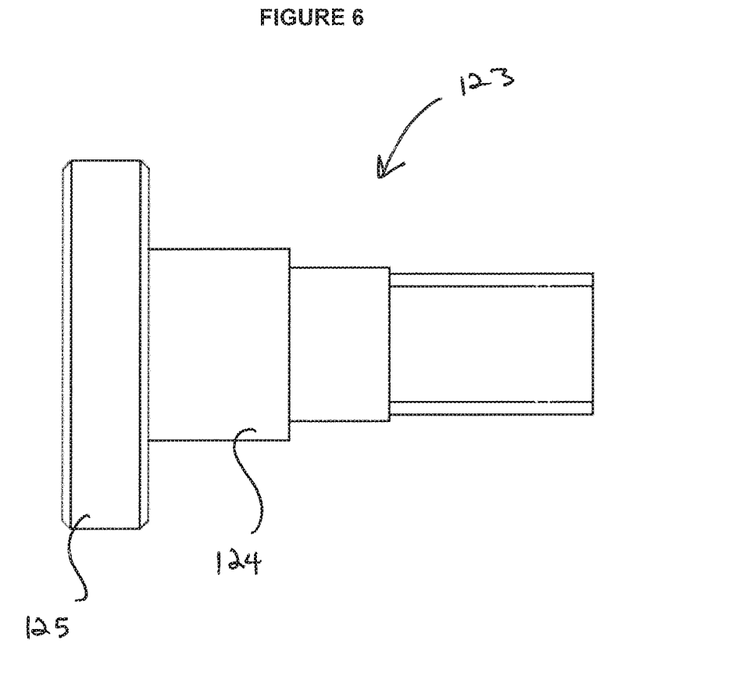
FIG. 6 depicts a side elevational view of a projection according to various embodiments of the present disclosure.

Referring now to FIGS. 5 and 6, there are shown various views of the projections according to various embodiments. The projections 123 comprise a head 125 that is attached to a shaft 124. The head 125 has a width or diameter that is larger than the width or the diameter of the shaft 124. The heads 125 of the projections 123 are configured to serve as obstructions that physically prevent the projections 123 from being pulled transversely from the blocks 126 when the projections 123 are engaged therewith, to thereby inhibit blasting open of the door upon the occurrence of an internal arc within the enclosure 101. Although depicted as circular or cylindrical in shape, the head 125 and the shaft 124 can include any shape or geometric configuration.

In one embodiment, the head 125 is fixedly attached to the shaft 124. In another embodiment, the head 125 comprises a roller that is rotatably attached to the shaft 124. In this embodiment, the rollers are configured to contact the interior surface 109 of the door 102 and/or the peripheral edge 105 of the body 103 in order to support the roller thereagainst and minimize friction from the translation of the bar members 122 between the locked and unlocked positions. Minimizing friction from the translation of the bar members 122 reduces the amount of force required to engage and disengage the locking assembly 121.

Figure 7:
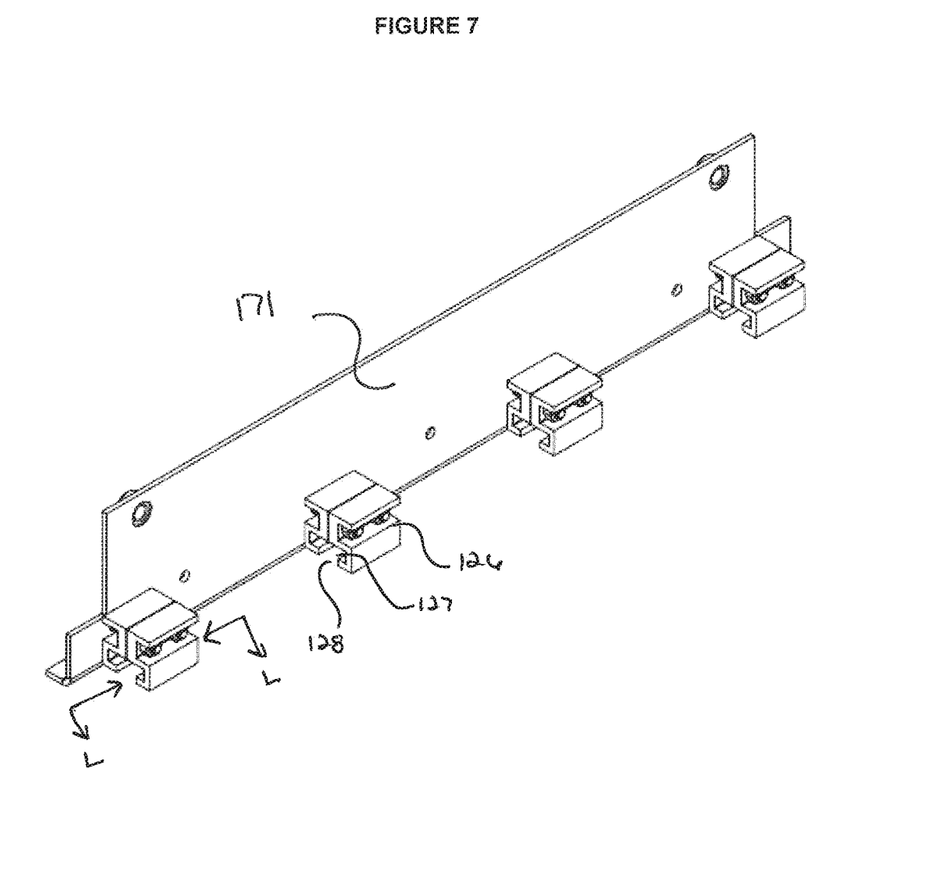
FIG. 7 depicts a perspective view of the blocks supported along the body of the enclosure according to various embodiments of the present disclosure.
Figure 8:
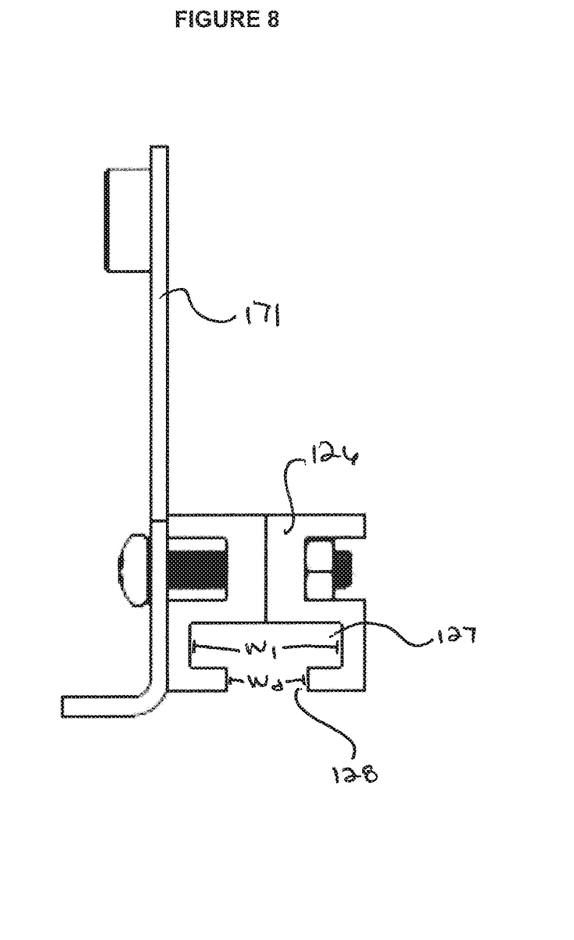
FIG. 8 depicts a side elevational view of a block supported along the body of the enclosure according to various embodiments of the present disclosure.

Referring now to FIGS. 7 and 8, there are shown various views of the blocks supported along the body of the enclosure according to various embodiments. The blocks 126 which are configured to engage and received the corresponding projections 123 of the bar members 122 are positioned linearly along one or more edges of the opening 104. Each block 126 comprises a channel 127 that is sized and shaped to receive a head 125 of the projection 123 and an open portion 128 that is sized and shaped to permit the shaft 124 to translate therethrough. The open portion 128 has a width, $W_2$, that is less than the width, $W_1$, of the channel 127, thereby preventing the head 125 of the projection 123 from being withdrawn from the block 126 in a direction transverse to the longitudinal axis L-L of the channel 127.

In one embodiment, the dimensions of the channels 127 are equal to a close tolerance of the dimensions of the heads 125. In another embodiment, the dimensions of the channels 127 are larger than the dimensions of the heads 125 by a factor, e.g., 5%. In this embodiment, the larger width or size of the channels 127 relative to the corresponding heads 125 allows for a larger degree of error in aligning the projections 123 with the corresponding blocks 126 when locking the enclosure 101, thereby preventing failures of the locking assembly 121 due to misalignment of the components.

In one embodiment, the blocks 126 are secured to the enclosure 101 by mounting the blocks 126 to a mounting plate 171, as shown in FIGS. 7 and 8, which is then secured to the enclosure 101. In this way, the locking assembly 121 can be retrofitted to an existing enclosure. In this embodiment, the bar members 122 and necessary linkages are correspondingly mounted to the interior surface 109 of the door 102. The mounting plate 171 can be secured to the enclosure 101 via, e.g., fasteners, welding, or soldering. In another embodiment, the enclosure 101 is constructed such that the blocks 126 are secured directly to the peripheral edge 105 of the body 103 or are integrally formed with the body 103.

Figure 9:
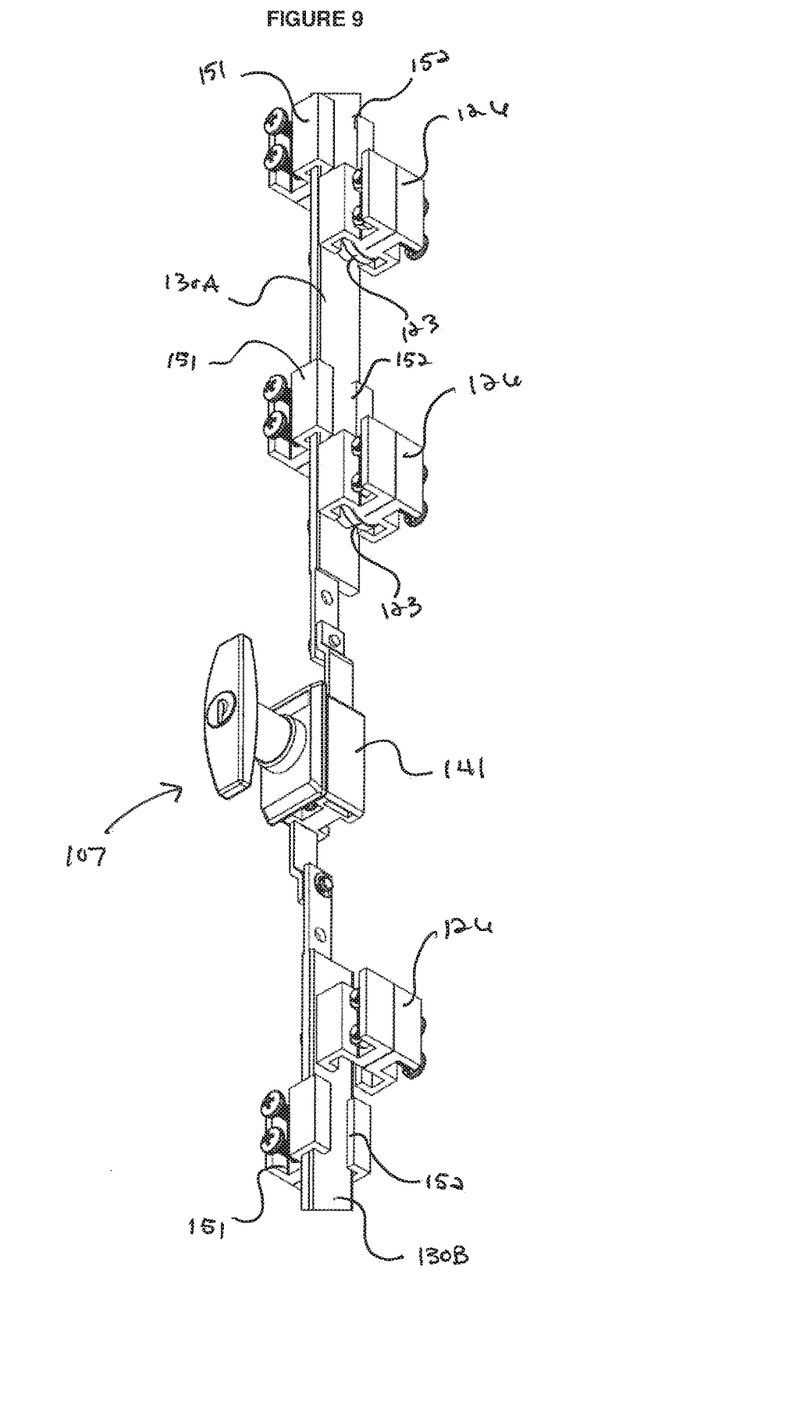
FIG. 9 depicts a perspective view of the locking assembly in a locked position according to various embodiments of the present disclosure.
Figure 10:
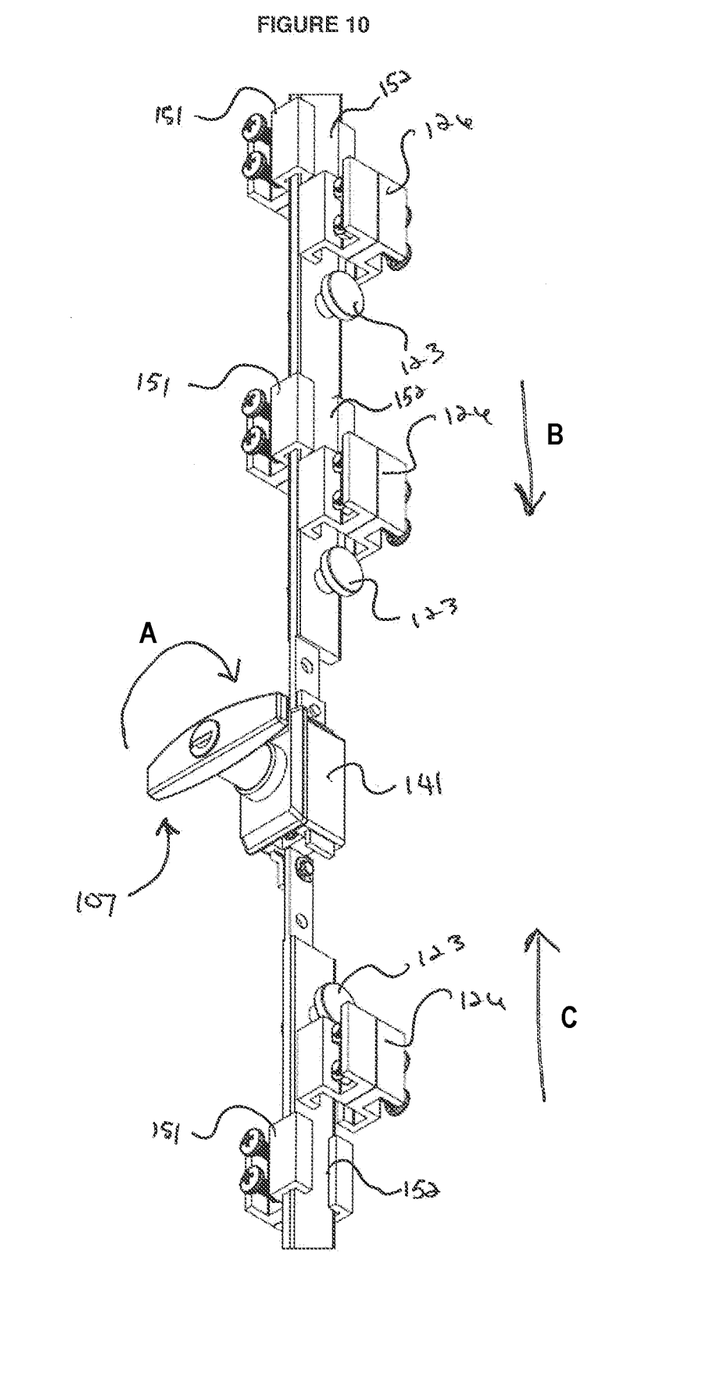
FIG. 10 depicts a perspective view of the locking assembly in an unlocked position according to various embodiments of the present disclosure.
Figure 11:
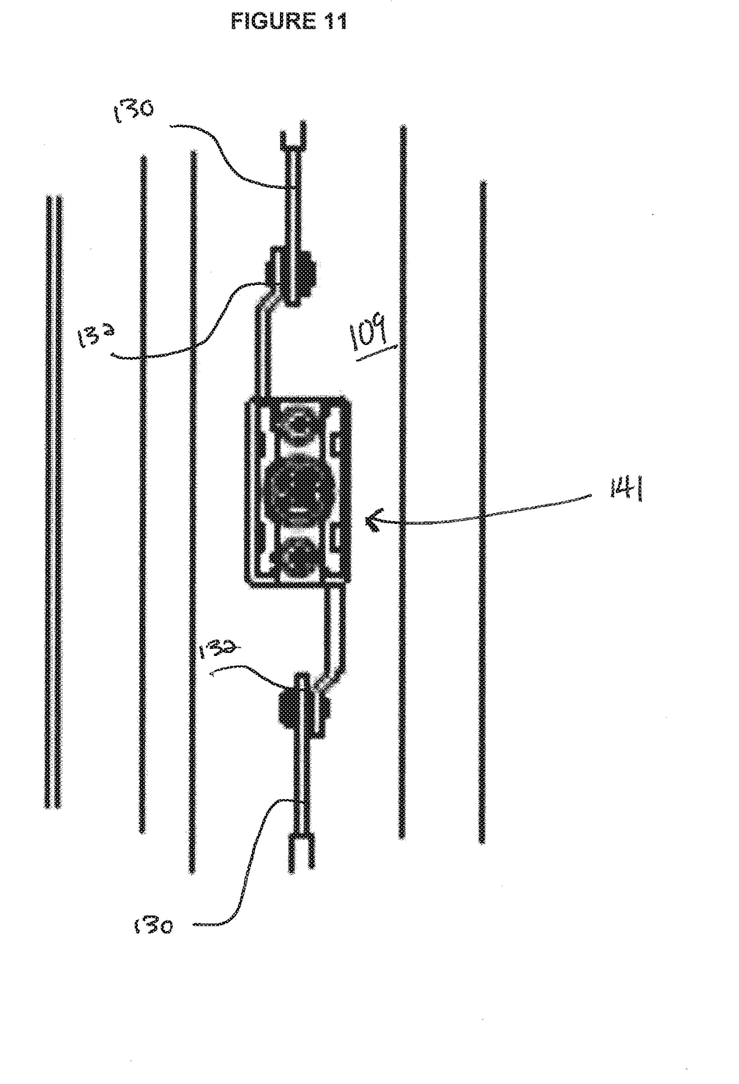
FIG. 11 depicts a perspective view of a mechanical linkage of the actuator according to various embodiments of the present disclosure.

Referring now to FIGS. 9 and 10, there are shown perspective views of the locking assembly in locked and unlocked positions, respectively. In the depicted embodiment, the actuator 107 comprises a handle operably coupled to a mechanical linkage 141, e.g., a three-point latch, which is also depicted in FIG. 11. In this embodiment, the locking assembly 121 comprises a first vertical bar member 130A and a second vertical bar member 130B that are coupled to the three-point latch. Actuating the handle from the locked position (in a direction indicated by arrow A), depicted in FIG. 9, to the unlocked position, depicted in FIG. 10, causes the first vertical bar member 130A to translate downwardly (in a direction indicated by arrow B) and causes the second vertical bar 130B member to translate upwardly (in a direction indicated by arrow C). The translation of the first and second vertical bar members 130A, 130B translates the projections 123 thereon longitudinally out of engagement with the corresponding blocks 126. Due to the action of the transitional linkage 131, the horizontal bar members 129 are likewise translated longitudinally out of engagement with the blocks 126. Once the projections 123 are disengaged from the blocks 126, then door 102 can then be opened without restriction from the locking assembly 121.

In alternative embodiments, the actuator 107 can instead comprise one or more motors that are operably connected to the bar members. In this embodiment, the motor or motors activate upon receiving an appropriate input, thereby driving the bar members 122 longitudinally in or out of engagement with the respective blocks 126. In some embodiments, the horizontal bar members 129 can be connected to the vertical bar members 130 via a transitional linkage, e.g., as depicted in FIG. 2. In these embodiments, motion imparted upon at least one of the bar members 122 by a motor is translated to the other bar members 122, as described above. In other embodiments, a motor is provided to translate the assembly of bar members 122 at each edge of the door 102. In one such embodiment, a first motor is operably connected to the assembly of vertical bar members 130, a second motor is operably connected to the assembly of the upper horizontal bar members 129, and a third motor is operably connected to the assembly of the lower horizontal bar members 129. The motors are each configured to longitudinally translate their respective bar members 122, to which the motors are operably coupled, independently from the function of the other motors or without mechanical linkage to any of the other sets of bar members 122. Each of the first motor, the second motor, and the third motor are in electrical or signal communication with a controller or computer configured to receive an input for activating the motors and controlling the position of the bar members 122. In some embodiments, the input device for activating the motors is a touchscreen disposed, e.g., on the exterior surface of the enclosure, which is configured to receive an input command from a user and thereby control the activation of the motors. In other embodiments, the input device for activating the motors is a keyway configured to receive a key, where actuating the keyway via the key mechanically activates the motors or relays a signal to the motors or a controller associated with the motors that causes the motors to activate and thereby translate the locking assembly 121 between the locked and unlocked positions.

In alternative embodiments, the actuator can comprise multiple handles, rather than a single handle as depicted. For example, the actuator can comprise a first handle that is operably coupled to a first vertical bar member and configured to control the translation thereof and a second handle that is operably coupled to a second vertical bar member and likewise configured to control the translation thereof. In this embodiment, each handle and associated assembly of bar members is independently transitionable between the locked and unlocked positions. Thus, both handles would have to be in the unlocked position to unlock the enclosure and both handles would have to be in the locked position for the enclosure to be fully locked.

In the depicted embodiment, the actuator is depicted as positioned between a first vertical bar member and a second vertical bar member. In other words, the actuator bifurcates the vertical bar member assembly into two separate components, which are each individually linked to the actuator. Such an arrangement allows forces to be applied equally to the bottom and top portions of the locking assembly. However, such an arrangement is merely illustrative and no such limitation on the position of the actuator is intended. The actuator can be positioned anywhere along the door and in operable engagement with the assembly of bar members in a variety of alternative configurations.

The enclosure can be constructed in a variety of different manners with a variety of different materials. Such materials can include metallic materials, e.g., mild steel, stainless steel, carbon fiber steel, aluminum, and sheet carbon nanotube, and high strength non-metallic materials, e.g., glass giber, including bulk molding compound and sheet molding compound, boron fiber, and para-aramid synthetic fiber. The door, body, bar members, and projections of the enclosure can be constructed from the same material or different materials. The various components of the enclosure can be secured together utilizing a variety of different means or methods, e.g., fastening, welding, and soldering.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. An enclosure comprising:
   a body defining an opening;
   a door pivotably attached to the body;
   a plurality of bar members translatably attached to an interior surface of the door, each of the plurality of bar members comprising a projection;
   wherein each projection comprises a head and a shaft, the head comprising a width larger than a width of the shaft
   an actuator operably connected to the plurality of bar members;
   wherein the actuator, when actuated in a first manner, causes each of the plurality of bar members to translate between a first position and a second position; and
   a plurality of blocks disposed about a peripheral edge of the opening of the body, such that there is a corresponding block for each projection, and wherein each of the plurality of blocks define a channel for receiving and engaging its corresponding projection;
   wherein when the door is in a closed position:
      translation of the plurality of bar members to the first position causes each projection to engage with the channel of its corresponding block to thereby hold the door in the closed position; and
      translation of the plurality of bar members to the second position causes each projection to be translated out of engagement with its corresponding block such that the door can be opened.

2. The enclosure of claim 1, wherein the width of the head is equal to a close tolerance of a width of the channel.

3. The enclosure of claim 1, wherein the width of the head is smaller than the width of the channel.

4. The enclosure of claim 1, wherein the projections comprise rollers.

5. The enclosure of claim 1, wherein the projections are fixedly attached to the plurality of bar members.

6. The enclosure of claim 1, wherein the projections are constructed from a metallic material, the metallic material selected from a group consisting of mild steel, stainless steel, carbon fiber steel, aluminum, and carbon nanotubes.

7. The enclosure of claim 1, wherein the projections are constructed from a non-metallic material, the non-metallic material selected from a group consisting of glass fiber, boron fiber, and para-aramid synthetic fiber.

8. The enclosure of claim 1, wherein the plurality of bar members are positioned about a peripheral edge of the interior surface of the door.

9. The enclosure of claim 1, wherein the plurality of bar members are positioned about a first peripheral edge, a second peripheral edge, and a third peripheral edge of the interior surface of the door.

10. The enclosure of claim 1, wherein the plurality of bar members are caused to translate longitudinally by the actuator.

11. The enclosure of claim 1, wherein the plurality of bar members comprise a horizontal bar member assembly and a vertical bar member assembly, the horizontal bar member assembly caused to translate horizontally by the actuator and the vertical bar member assembly caused to translate vertically by the actuator.

12. The enclosure of claim 1, further comprising a plurality of guide blocks disposed on the interior surface of the door, the guide blocks slidably supporting the plurality of bar members.

13. The enclosure of claim 1, wherein the actuator is a first actuator and the plurality of bar members are a first set of bar members, the enclosure further comprising:
   a second set of bar members translatably attached to the interior surface of the door, each of the second set of bar members comprising a projection; and
   a second actuator operably connected to the second set of bar members;
   wherein actuation of the second actuator causes the plurality of bar members to translate between a first position and a second position.

14. The enclosure of claim 1, wherein the actuator is selected from a group consisting of a handle, a detachable lever, a motor, and a solenoid.

15. A locking assembly for use with an enclosure comprising a door and a body defining an opening, the locking assembly comprising:
   a plurality of bar members configured to be translatably attached to an interior surface of the door, each of the plurality of bar members comprising a projection;
   wherein each projection comprises a head and a shaft, the head comprising a width larger than a width of the shaft;
   an actuator operably connected to the plurality of bar members;

wherein the actuator is configured to cause each of the plurality of bar members to translate between a first position and a second position; and a plurality of blocks configured to be attached about a peripheral edge of the opening of the body, such that there is a corresponding block for each projection, and wherein each of the plurality of blocks define a channel for receiving and engaging its corresponding projection;

wherein when the plurality of bar members are aligned with the plurality of blocks:
 translation of the plurality of bar members to the first position causes each projection to engage with the channel of its corresponding block; and
 translation of the plurality of bar members to the second position causes each projection to be translated out of engagement with its corresponding block.

16. The locking assembly of claim 15, wherein the projections comprise rollers.

17. The locking assembly of claim 15, wherein the projections are fixedly attached to the plurality of bar members.

18. The locking assembly of claim 15, wherein the projections are constructed from a metallic material, the metallic material selected from a group consisting of stainless steel and carbon fiber steel.

19. The locking assembly of claim 15, wherein the projections are constructed from a high strength non-metallic material.

20. The locking assembly of claim 15, wherein the plurality of bar members comprise a horizontal bar member assembly and a vertical bar member assembly, the horizontal bar member assembly translated horizontally by the actuator and the vertical bar member assembly translated vertically by the actuator.

21. The locking assembly of claim 15, wherein the actuator is selected from a group consisting of a handle, a detachable lever, a motor, and a solenoid.

22. An enclosure comprising:
 a body defining an opening;
 a door pivotably attached to the body;
 a plurality of bar members translatably attached to an interior surface of the door, each of the plurality of bar members comprising a projection;
 wherein the projections comprise rollers;
 an actuator operably connected to the plurality of bar members;
 wherein the actuator, when actuated in a first manner, causes each of the plurality of bar members to translate between a first position and a second position; and
 a plurality of blocks disposed about a peripheral edge of the opening of the body, such that there is a corresponding block for each projection, and wherein each of the plurality of blocks define a channel for receiving and engaging its corresponding projection;
 wherein when the door is in a closed position:
  translation of the plurality of bar members to the first position causes each projection to engage with the channel of its corresponding block to thereby hold the door in the closed position; and
  translation of the plurality of bar members to the second position causes each projection to be translated out of engagement with its corresponding block such that the door can be opened.

23. An enclosure comprising:
 a body defining an opening;
 a door pivotably attached to the body;
 a plurality of bar members translatably attached to an interior surface of the door, each of the plurality of bar members comprising a projection;
 an actuator operably connected to the plurality of bar members;
 wherein the actuator, when actuated in a first manner, causes each of the plurality of bar members to translate longitudinally between a first position and a second position;
 a plurality of blocks disposed about a peripheral edge of the opening of the body, such that there is a corresponding block for each projection, and wherein each of the plurality of blocks define a channel for receiving and engaging its corresponding projection;
 wherein when the door is in a closed position:
  translation of the plurality of bar members to the first position causes each projection to engage with the channel of its corresponding block to thereby hold the door in the closed position; and
  translation of the plurality of bar members to the second position causes each projection to be translated out of engagement with its corresponding block such that the door can be opened.

24. An enclosure comprising:
 a body defining an opening;
 a door pivotably attached to the body;
 a plurality of bar members translatably attached to an interior surface of the door, each of the plurality of bar members comprising a projection;
 an actuator operably connected to the plurality of bar members;
 wherein the actuator, when actuated in a first manner, causes each of the plurality of bar members to translate between a first position and a second position;
 wherein the plurality of bar members comprise a horizontal bar member assembly and a vertical bar member assembly, the horizontal bar member assembly caused to translate horizontally by the actuator and the vertical bar member assembly caused to translate vertically by the actuator; and
 a plurality of blocks disposed about a peripheral edge of the opening of the body, such that there is a corresponding block for each projection, and wherein each of the plurality of blocks define a channel for receiving and engaging its corresponding projection;
 wherein when the door is in a closed position:
  translation of the plurality of bar members to the first position causes each projection to engage with the channel of its corresponding block to thereby hold the door in the closed position; and
  translation of the plurality of bar members to the second position causes each projection to be translated out of engagement with its corresponding block such that the door can be opened.

25. A locking assembly for use with an enclosure comprising a door and a body defining an opening, the locking assembly comprising:
 a plurality of bar members configured to be translatably attached to an interior surface of the door, each of the plurality of bar members comprising a projection;
 wherein the projections comprise rollers;
 an actuator operably connected to the plurality of bar members;
 wherein the actuator is configured to cause each of the plurality of bar members to translate between a first position and a second position; and a plurality of blocks configured to be attached about a peripheral edge of the opening of the body, such that there is a corresponding block for each projection, and wherein each of the plurality of blocks define a channel for receiving and engaging its corresponding projection;

wherein when the plurality of bar members are aligned with the plurality of blocks:

translation of the plurality of bar members to the first position causes each projection to engage with the channel of its corresponding block; and translation of the plurality of bar members to the second position causes each projection to be translated out of engagement with its corresponding block.

26. A locking assembly for use with an enclosure comprising a door and a body defining an opening, the locking assembly comprising:

a plurality of bar members configured to be translatably attached to an interior surface of the door, each of the plurality of bar members comprising a projection;

an actuator operably connected to the plurality of bar members;

wherein the actuator is configured to cause each of the plurality of bar members to translate between a first position and a second position;

wherein the plurality of bar members comprise a horizontal bar member assembly and a vertical bar member assembly, the horizontal bar member assembly translated horizontally by the actuator and the vertical bar member assembly translated vertically by the actuator; and a plurality of blocks configured to be attached about a peripheral edge of the opening of the body, such that there is a corresponding block for each projection, and wherein each of the plurality of blocks define a channel for receiving and engaging its corresponding projection;

wherein when the plurality of bar members are aligned with the plurality of blocks:

translation of the plurality of bar members to the first position causes each projection to engage with the channel of its corresponding block; and translation of the plurality of bar members to the second position causes each projection to be translated out of engagement with its corresponding block.

27. A locking assembly for use with an enclosure comprising a door and a body defining an opening, the locking assembly comprising:

a plurality of bar members configured to be translatably attached to an interior surface of the door, each of the plurality of bar members comprising a projection;

an actuator operably connected to the plurality of bar members;

wherein the actuator is configured to cause each of the plurality of bar members to translate longitudinally between a first position and a second position; and a plurality of blocks configured to be attached about a peripheral edge of the opening of the body, such that there is a corresponding block for each projection, and wherein each of the plurality of blocks define a channel for receiving and engaging its corresponding projection;

wherein when the plurality of bar members are aligned with the plurality of blocks:

translation of the plurality of bar members to the first position causes each projection to engage with the channel of its corresponding block; and translation of the plurality of bar members to the second position causes each projection to be translated out of engagement with its corresponding block.

* * * * *